(12) United States Patent
Chang

(10) Patent No.: US 10,237,467 B2
(45) Date of Patent: Mar. 19, 2019

(54) IMAGE CAPTURING DEVICE AND AN IMAGE CAPTURING METHOD

(71) Applicant: Coretronic Corporation, Hsin-Chu (TW)

(72) Inventor: Chuan-Chung Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 35 days.

(21) Appl. No.: 15/183,787

(22) Filed: Jun. 16, 2016

(65) Prior Publication Data

US 2017/0118397 A1 Apr. 27, 2017

(30) Foreign Application Priority Data

Oct. 22, 2015 (CN) .......................... 2015 1 0689193

(51) Int. Cl.
*H04N 5/232* (2006.01)
*G02B 27/00* (2006.01)
*G02F 1/19* (2019.01)

(52) U.S. Cl.
CPC ..... *H04N 5/23212* (2013.01); *G02B 27/0075* (2013.01); *G02F 1/19* (2013.01); *H04N 5/23232* (2013.01)

(58) Field of Classification Search
CPC ........... H04N 5/23212; H04N 5/23232; G02B 27/0075; G02F 1/19
See application file for complete search history.

(56) References Cited

U.S. PATENT DOCUMENTS

| 5,729,011 A | * | 3/1998 | Sekiguchi | ................ | G01J 3/14 |
| | | | | | 250/208.1 |
| 6,222,631 B1 | * | 4/2001 | Terauchi | ................... | G01J 3/36 |
| | | | | | 250/226 |
| 6,856,708 B1 | | 2/2005 | Aoki | | |

(Continued)

FOREIGN PATENT DOCUMENTS

| CN | 101554042 | 10/2009 |
| CN | 101840056 | 9/2010 |

(Continued)

OTHER PUBLICATIONS

Dowski et al., "Extended depth of field through wave-front coding," Applied Optics, Apr. 10, 1995, pp. 1859-1866.

(Continued)

*Primary Examiner* — Abdelaaziz Tissire
(74) *Attorney, Agent, or Firm* — JCIPRNET

(57) ABSTRACT

An image capturing device adapted to capture a plurality of images of an object and an image capturing method are provided. The image capturing device includes an image sensing element, a first lens element, a second lens element and a variable focal length lens element. The image sensing element includes a plurality of image sensing pixels. The first lens element focuses a beam coming from the object to a focus position in a range of depth of focus. The variable focal length lens element is disposed between the first lens element and the second lens element or inside the first lens element, and is configured to adjust a focus object distance of the image capturing device. The beam has an image width on an image plane of the range of depth of focus. The image width is smaller than a first pixel width.

19 Claims, 11 Drawing Sheets

(56) References Cited

U.S. PATENT DOCUMENTS

| | | | |
|---|---|---|---|
| 8,243,157 B2 | 8/2012 | Ng et al. | |
| 8,305,429 B2 | 11/2012 | Kajihara et al. | |
| 8,593,564 B2* | 11/2013 | Border | H04N 5/23229 348/340 |
| 8,619,177 B2 | 12/2013 | Perwass et al. | |
| 2003/0142877 A1* | 7/2003 | George | G02B 3/04 382/254 |
| 2008/0266655 A1* | 10/2008 | Levoy | G02B 21/361 359/368 |
| 2008/0308712 A1* | 12/2008 | Ono | G02B 5/26 250/208.1 |
| 2009/0027542 A1* | 1/2009 | Yamamoto | H04N 5/2254 348/340 |
| 2009/0140131 A1* | 6/2009 | Utagawa | G02B 3/0056 250/226 |
| 2009/0190022 A1* | 7/2009 | Ichimura | G02B 3/0056 348/340 |
| 2010/0085468 A1* | 4/2010 | Park | H04N 5/23212 348/345 |
| 2010/0141802 A1* | 6/2010 | Knight | H04N 5/23212 348/240.3 |
| 2010/0215354 A1* | 8/2010 | Ohnishi | G02B 7/38 396/113 |
| 2010/0232776 A1* | 9/2010 | Ohnishi | G02B 7/346 396/104 |
| 2011/0073752 A1* | 3/2011 | Berkner | G01J 1/0492 250/227.2 |
| 2012/0105596 A1 | 5/2012 | Li | |
| 2013/0235256 A1* | 9/2013 | Kodama | G01J 3/0208 348/360 |
| 2013/0250167 A1* | 9/2013 | Nagasaka | G02B 3/0037 348/360 |
| 2013/0265485 A1 | 10/2013 | Kang | |
| 2014/0028869 A1 | 1/2014 | Hatakeyama | |
| 2014/0104618 A1 | 4/2014 | Potsaid et al. | |
| 2015/0146075 A1* | 5/2015 | Kodama | G01J 3/0208 348/340 |
| 2015/0358531 A1* | 12/2015 | Xu | H04N 13/232 348/345 |
| 2016/0358001 A1* | 12/2016 | Chen | G06K 7/10732 |

FOREIGN PATENT DOCUMENTS

| | | |
|---|---|---|
| CN | 102221746 | 10/2011 |
| CN | 104683684 | 6/2015 |
| TW | I424190 | 1/2014 |

OTHER PUBLICATIONS

Sung et al., "Design of mobile phone lens with extended depth of field based on point-spread function focus invariance," Proceedings of SPIE, Sep. 11, 2008, pp. 706107-1-706107-11.

Lim et al., "Resolution-enhanced integral imaging microscopy that uses lens array shifting," Optics Express, Oct. 12, 2009, pp. 19253-19263.

Hsieh et al., "Resolution Enhanced Integral Image Microscope with Liquid Crystal Wedge," Optics & Photonics Taiwan, the International Conference (OPTIC), Dec. 4-5, 2014, pp. 1-2.

Martinez-Corral et al., "Fast Axial-Scanning Widefield Microscopy With Constant Magnification and Resolution," Journal of Display Technology, Nov. 2015, pp. 913-920.

Lei et al., "An electrically tunable plenoptic camera using a liquid crystal microlens array," Review of Scientific Instruments, May 15, 2015, pp. 86, 053101-1-86, 053101-8.

"Office Action of China Counterpart Application", dated Sep. 5, 2018, p. 1-p. 10.

\* cited by examiner

IMAGE CAPTURING DEVICE AND AN IMAGE CAPTURING METHOD

CROSS-REFERENCE TO RELATED APPLICATION

This application claims the priority benefit of China application serial no. 201510689193.0, filed on Oct. 22, 2015. The entirety of the above-mentioned patent application is hereby incorporated by reference herein and made a part of this specification.

BACKGROUND OF THE INVENTION

Field of the Invention

The invention relates to an optical device, and particularly relates to an image capturing device and an image capturing method.

Description of Related Art

According to a light field imaging technique, an image recorded by a light field imaging device (for example, a light field camera) may have angle information through combination of lenses and a lens array. For example, a plurality of images with different optical parallaxes can be obtained according to the light field imaging technique. The images may have effects of afterwards focusing, selective focusing, full focusing, multi-viewing angle, objects separation, etc. after the images with the angle information are processed. The existing light field cameras may be divided into three architectures such as a camera array architecture, a non-focused architecture and a focused architecture. For example, the focused light field camera adopts a main lens in collaboration with a lens array. The main lens is focused in front of or in rear of the lens array, and the lens array further re-images an imaging of the main lens.

Since the light field camera may produce images with at least two or more pieces of angle information, the number of pixels and the resolution of the image with the angle information that is captured by the light field camera are lower than that of a conventional camera regarding an image with a single piece of the angle information. If the angle information obtained by the light field camera is more, the number of the pixels in the processed image with the specific angel information is lower. Since the light field camera still has to use optical elements to transmit the image to an image sensor, it only has a limited depth of field (DOF) similar to that of the conventional camera, i.e. when a larger aperture is adopted, the light field camera may have a problem of a shorter DOF of the image. Although the light field camera has the DOF slightly larger than the DOF of the conventional camera due to an optical structure thereof, the DOF of the light field camera is still limited.

The information disclosed in this "Description of the Related Art" section is only for enhancement of understanding of the background of the described technology and therefore it may contain information that does not form the prior art that is already known to a person of ordinary skill in the art. Further, the information disclosed in the "Description of the Related Art" section does not mean that one or more problems to be resolved by one or more embodiments of the invention were acknowledged by a person of ordinary skill in the art.

SUMMARY OF THE INVENTION

The invention is directed to an image capturing device, which includes a variable focal length lens element to obtain images with different depths of field.

The invention is directed to an image capturing method. Images with different depths of field are obtained by using a variable focal length lens element through the image capturing method.

Other objects and advantages of the invention can be further illustrated by the technical features broadly embodied and described as follows.

In order to achieve one or a portion of or all of the objects or other objects, an embodiment of the invention provides an image capturing device adapted to capture a plurality of images of an object. The image capturing device includes an image sensing element, a first lens element, a second lens element and a variable focal length lens element. The image sensing element includes a plurality of image sensing pixels configured to sense the images. The first lens element is configured to focus at least one beam coming from the object to a focus position in a range of depth of focus of the first lens element. The second lens element is disposed between the first lens element and the image sensing element. The variable focal length lens element is disposed between the first lens element and the second lens element or inside the first lens element, and is configured to adjust a focus object distance of the image capturing device. The beam has an image width on an image plane of the range of depth of focus of the first lens element, where the image width is smaller than a first pixel width.

In order to achieve one or a portion of or all of the objects or other objects, an embodiment of the invention provides an image capturing method. The image capturing method captures a depth of field image of an object by using an image capturing device. The image capturing device includes a first lens element, a second lens element and an image sensing element arranged in sequence. The image capturing device further includes a variable focal length lens element. The variable focal length lens element is disposed between the first lens element and the second lens element or inside the first lens element. The image capturing method includes following steps. The variable focal length lens element is controlled to adjust a focus object point of the image capturing device. The first lens element has a range of depth of focus. A beam coming from the object is focused to a focus position in the range of depth of focus by using the first lens element. The beam has an image width on an image plane within the range of depth of focus of the first lens element, where the image width is smaller than a first pixel width. The beam coming from the first lens element is imaged on the image sensing element by using the second lens element. The images with different magnifications are sensed at a plurality of different time by using the image sensing element. Magnifications of the images with different magnifications are adjusted to be consistent. At least a part of regions is selected from the images with consistent magnification, and the selected at least a part of regions are combined to form the depth-of-field image.

According to the above descriptions, the embodiment of the invention has at least one of the following advantages or effects. In the embodiment of the invention, the image capturing device includes the variable focal length lens element, and in the image capturing method, the variable focal length lens element is adopted to adjust a focal length of the image capturing device. Therefore, the image width of the beam on the image plane is smaller than the predetermined pixel width, so as to obtain the images with different depths of field.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional technology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
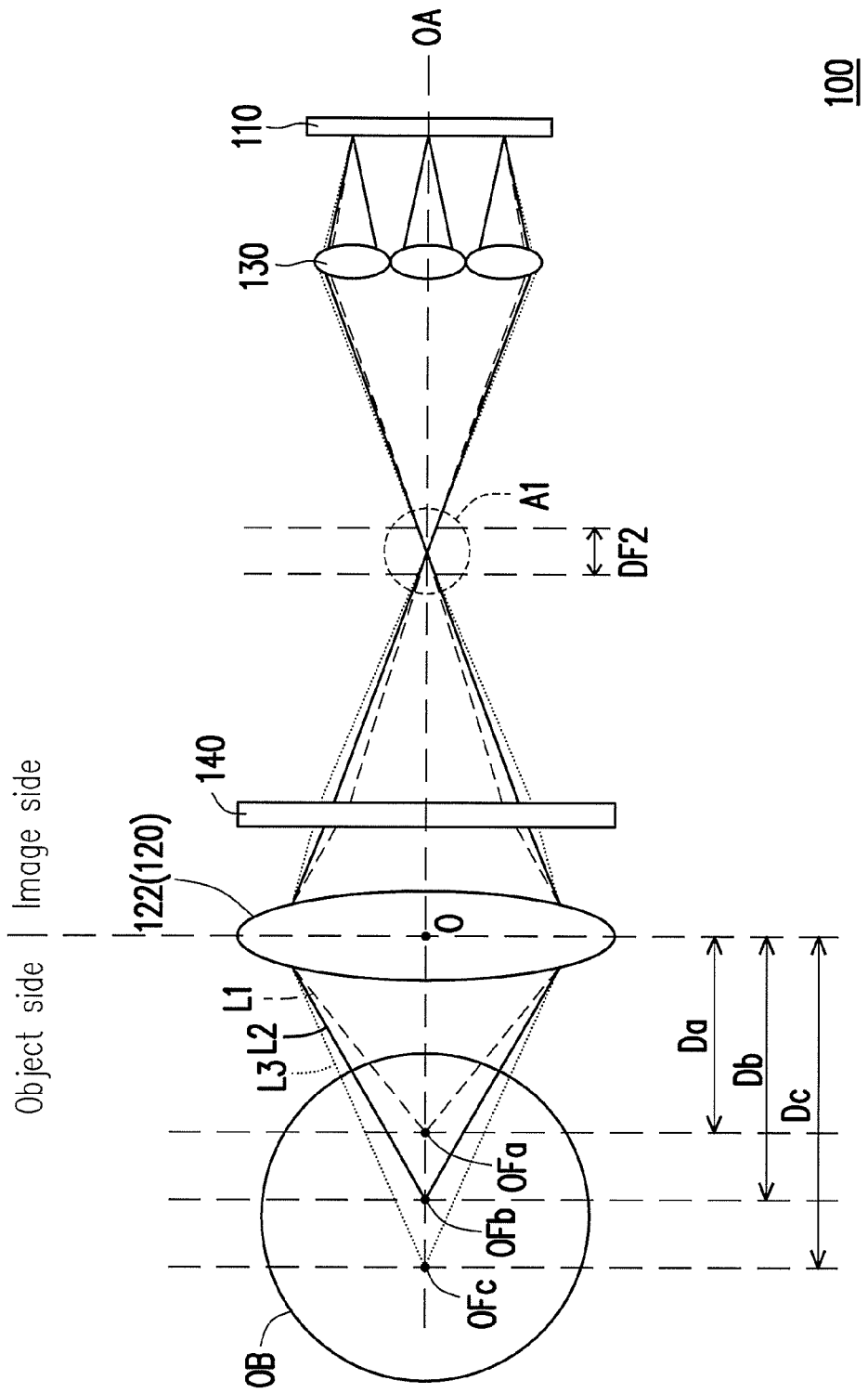
FIG. 1A is a cross-sectional view of an image capturing device according to an embodiment of the invention.

FIG. 1A is a cross-sectional view of an image capturing device according to an embodiment of the invention. Referring to FIG. 1A, in the embodiment, the image capturing device 100 is configured to capture a plurality of images (not shown) of an object OB. The image capturing device 100 includes an image sensing element 110, a first lens element 120, a second lens element 130 and a variable focal length lens element 140. The second lens element 130 is disposed between the first lens element 120 and the image sensing element 110, and the variable focal length lens element 140 is disposed between the first lens element 120 and the second lens element 130. In detail, the image sensing element 110, the first lens element 120, the second lens element 130 and the variable focal length lens element 140 are located on an optical axis OA of the first lens element 120. When the variable focal length lens element 140 is not driven and a refractive index thereof is not changed, the first lens element 120 includes a main lens 122, and the main lens 122 has a range of depth of focus DF2, where the main lens 122 is configured to focus a beam coming from the object OB to be within the range of depth of focus DF2. To be specific, the beam coming from the object OB can be focused on the optical axis OA through the main lens 122.

In the embodiment, the variable focal length lens element 140 is configured to adjust a focus position of the image capturing device 100. To be specific, the variable focal length lens element 140 is, for example, a liquid crystal lens or other photoelectric element capable of changing a focal power. The focal power may be changed by applying a voltage on the variable focal length lens element 140 thereof. In some embodiment, the variable focal length lens element 140 may also change the focal power thereof through other methods. In the embodiment, the image capturing device 100 may selectively configure the beams of different parts of the object OB to focus within the range of depth of focus DF2 after the beams pass through the first lens element 120 and the variable focal length lens element 140 by changing the focal power of the variable focal length lens element 140. For example, the main lens 122 of the first lens element 120 of the embodiment includes a plurality of object points OFa, OFb, OFc on the object OB. Distances between the object points OFa, OFb, OFc and a center O of the main lens 122 are different. To be specific, the distance between the object point OFa and the center O is an object distance Da, the distance between the object point OFb and the center O is an object distance Db, and the distance between the object point OFc and the center O is an object distance Dc. The object distance Dc is greater than the object distance Db, and the object distance Db is greater than the object distance Da. In the embodiment, the focal power of the variable focal lens element may be adjusted by applying a voltage thereof. The image capturing device 100 may selectively configure a beam L1 coming from the object point OFa of the object OB to sequentially pass through the main lens 122 of the first lens element 120 and the variable focal length lens element 140 to focus within the range of depth of focus DF2. Alternatively, the image capturing device 100 may selectively configure a beam L2 coming the object point OFb of the object OB to sequentially pass through the main lens 122 of the first lens element 120 and the variable focal length lens element 140 to focus in the range of depth of focus DF2 by adjusting the focal power of the variable focal length lens element 140. Moreover, the image capturing device 100 may selectively make a beam L3 coming from the object point OFc of the object OB to sequentially pass through the main lens 122 of the first lens element 120 and the variable focal length lens element 140 to focus in the range of depth of focus DF2 by adjusting the focal power of the variable focal length lens element 140.

In the embodiment, the object points OFa, OFb, OFc are configured to schematically describe a method that the variable focal length lens element 140 may adjust focus object points of the image capturing device 100, such that the beams coming from different parts of the object may focus in the range of depth of focus DF2 after passing through the first lens element 120 and the variable focal length lens element 140. It should be noted that the object points OFa, OFb, OFc of the object OB are not used for limiting the invention, and those skilled in the art may suitably change parameters or settings according to the invention to change setting data without departing from the scope of the invention. For example, the object points of the object OB can be located at any positions on the object OB, or are not located on the object OB. Moreover, the object OB can be any tangible object, a scene or an image. In addition, the beams entering the image capturing device 100 may come from any active or passive light source in space, which is not limited by the invention.

Referring to FIG. 1A, in the embodiment, the beam coming from the object OB are focused in the range of depth of focus DF2 and enters the second lens element 130. Then, the image sensing element 110 receives the beam passing through the second lens element 130. To be specific, the second lens element 130, for example, includes a micro lens array (MLA). The image sensing element 110 includes a plurality of image sensing pixels (not shown) for sensing the images. Each of the image sensing pixels serves as a basic cell for sensing an optical signal, and has a predetermined pixel size. In the embodiment, the image sensing element 110, for example, includes a charge coupled device (CCD) image sensor, or a complementary metal oxide semiconductor (CMOS) image sensor, etc., which is not limited by the invention. Moreover, the image capturing device 100 is, for example, a focus type light field camera. However, in other embodiments, the image capturing device 100 can be a non-focus type light field camera, other type of light field camera or other type of optical image capturing device, which is not limited by the invention.

Figure 1B:
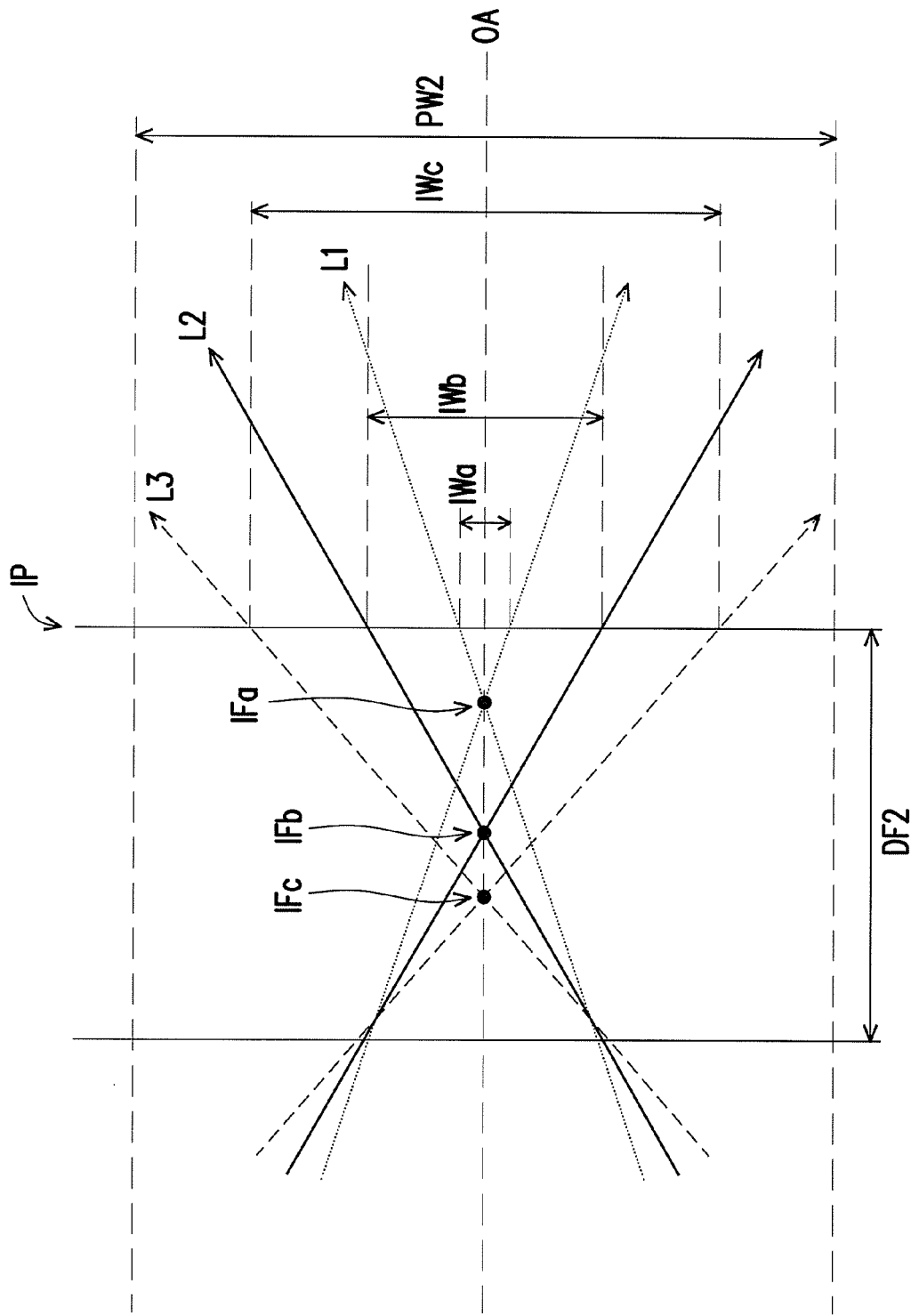
FIG. 1B is an enlarged view of a region A1 in FIG. 1A.

FIG. 1B is an enlarged view of a region A1 in FIG. 1A. Referring to FIG. 1A and FIG. 1B, in the embodiment, the variable focal length lens element 140 adjusts the beams L1, L2, L3 into beams with circular symmetric wavefront. The main lens 122 of the first lens element 120 and the variable focal length lens element 140 may selectively and respectively focus the beams L1, L2, L3 coming from the object points OFa, OFb, OFc of the object OB to focus positions IFa, IFb, IFc through a proper adjustment of the focal power of the variable focal length lens element 140. In the embodiment, the focus positions IFa, IFb, IFc are within the range of depth of focus DF2, and the focus positions IFa, IFb, IFc are located between the variable focal length lens element 140 and the second lens element 130, the beams L1, L2, L3 respectively have image widths IWa, IWb, IWc on an image plane IP of the range of depth of focus DF2 after passing through the focus positions IFa, IFb, IFc. Moreover, the range of depth of focus DF2 of the embodiment, for example, includes two boundaries with a range, and the image plane IP of the embodiment is located at a side of the range of depth of focus DF2 away from the first lens element 120. To be specific, the image widths IWa, IWb, IWc are smaller than a second pixel width PW2, and the second pixel width PW2 is, for example, a total width of five image sensing pixels (not shown) in the image sensing element 110, though the total width is not used for limiting the invention. In some embodiments, the second pixel width PW2 may adopt a total width of other number of the image sensing pixels based on the adjustment of the variable focal length lens element 140 on the beams L1, L2, L3. Alternatively, in some embodiments, the second pixel width PW2 may have different widths according to different designs of the image capturing device 100, the invention is not limited thereto.

In the embodiment, the variable focal length lens element 140 may selectively make the beams L1, L2, L3 coming from the object points OFa, OFb, OFc with different object distances Da, Db, Dc to focus within a smaller range after the beams pass through the main lens 122 of the first lens element 120 and the variable focal length lens element 140 by adjusting the focus object points of the image capturing device 100. To be specific, a distance between the focus position IFa and the focus position IFb is smaller than a distance between the object point OFa and the object point OFb, and a distance between the focus position IFb and the focus position IFc is smaller than a distance between the object point OFb and the object point OFc. Therefore, the image widths IWa, IWb, IWc of the beams L1, L2, L3 on the image plane IP of the range of depth of focus DF2 are accordingly limited within a smaller range. In the embodiment, when a voltage is exerted to the variable focal length lens element 140 to change the focal power thereof, an object point within a specific range can be selected, and a beam emitted from the object point is focused in the range of depth of focus DF2. An image width of the beam emitted from the object point within the specific range on the image plane IP of the range of depth of focus DF2 is smaller than the second pixel width PW2.

Figure 2:
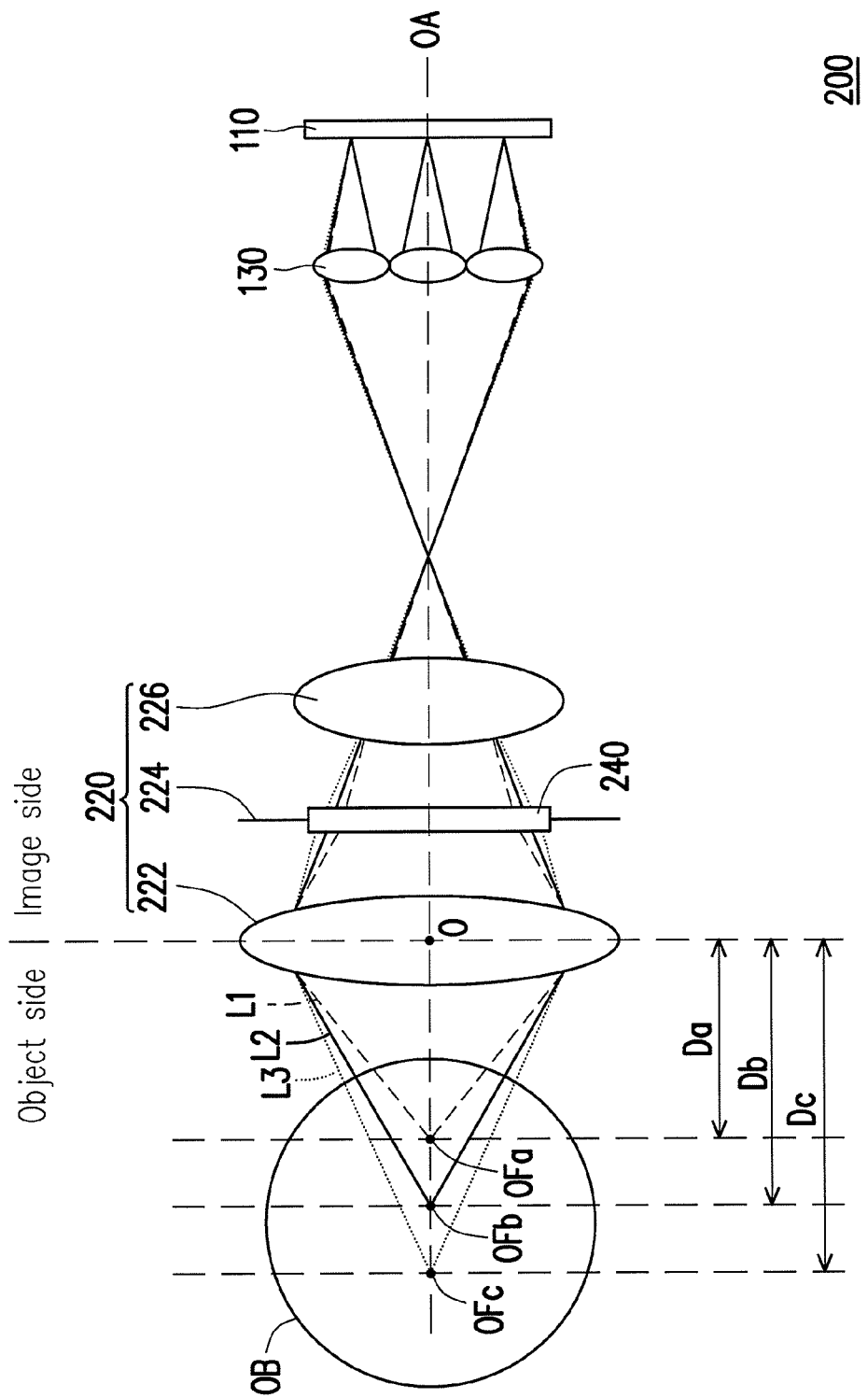
FIG. 2 is a cross-sectional view of an image capturing device according to another embodiment of the invention.

FIG. 2 is a cross-sectional view of an image capturing device according to another embodiment of the invention. Referring to FIG. 2, the image capturing device 200 of the present embodiment is similar to the image capturing device 100 of the embodiment of FIG. 1A. The components of the image capturing device 200 and related descriptions thereof may refer to the related descriptions of the image capturing device 100, and details thereof are not repeated. A main difference between the image capturing device 200 and the image capturing device 100 is that the first lens element 220 of the image capturing device 200 includes a main lens 222, an aperture 224 and a secondary lens 226, though the invention is not limited thereto, and other optical elements can be increased or decreased according to an actual design requirement. In the embodiment, the main lens 222, the aperture 224 and the secondary lens 226 are located on the optical axis OA of the first lens element 220, and the aperture 224 is disposed between the main lens 222 and the secondary lens 226. The variable focal length lens element 240 is disposed inside the first lens element 220, and is disposed at the aperture 224.

In the embodiment, the beams L1, L2, L3 coming from the object points OFa, OFb, OFc with different object distances Da, Db, Dc are selectively focused within a smaller range after pass through the main lens 222 of the first lens element 220, the variable focal length lens element 240 and the secondary lens 226 by adjusting the variable focal length lens element 240. To be specific, when a voltage is exerted to the variable focal length lens element 240 to change a focal power thereof, an object point within a specific range can be selected, a beam emitted from the object point is focused within the range of depth of focus, and an image width of the beam emitted from the object point within the specific range on the image plane of the range of depth of focus is smaller than the second pixel width. In the image capturing device 200, the proper secondary lens 226 can be adopted in collaboration with the main lens 222 and the variable focal length lens element 240 to focus the beams L1, L2, L3 within a smaller range. To be specific, the number of the secondary lens 226 can be one or plural, and a shape and a type of the secondary lens 226 can be adjusted according to different designs of the image capturing device 200, the invention is not limited thereto.

Figure 3A:
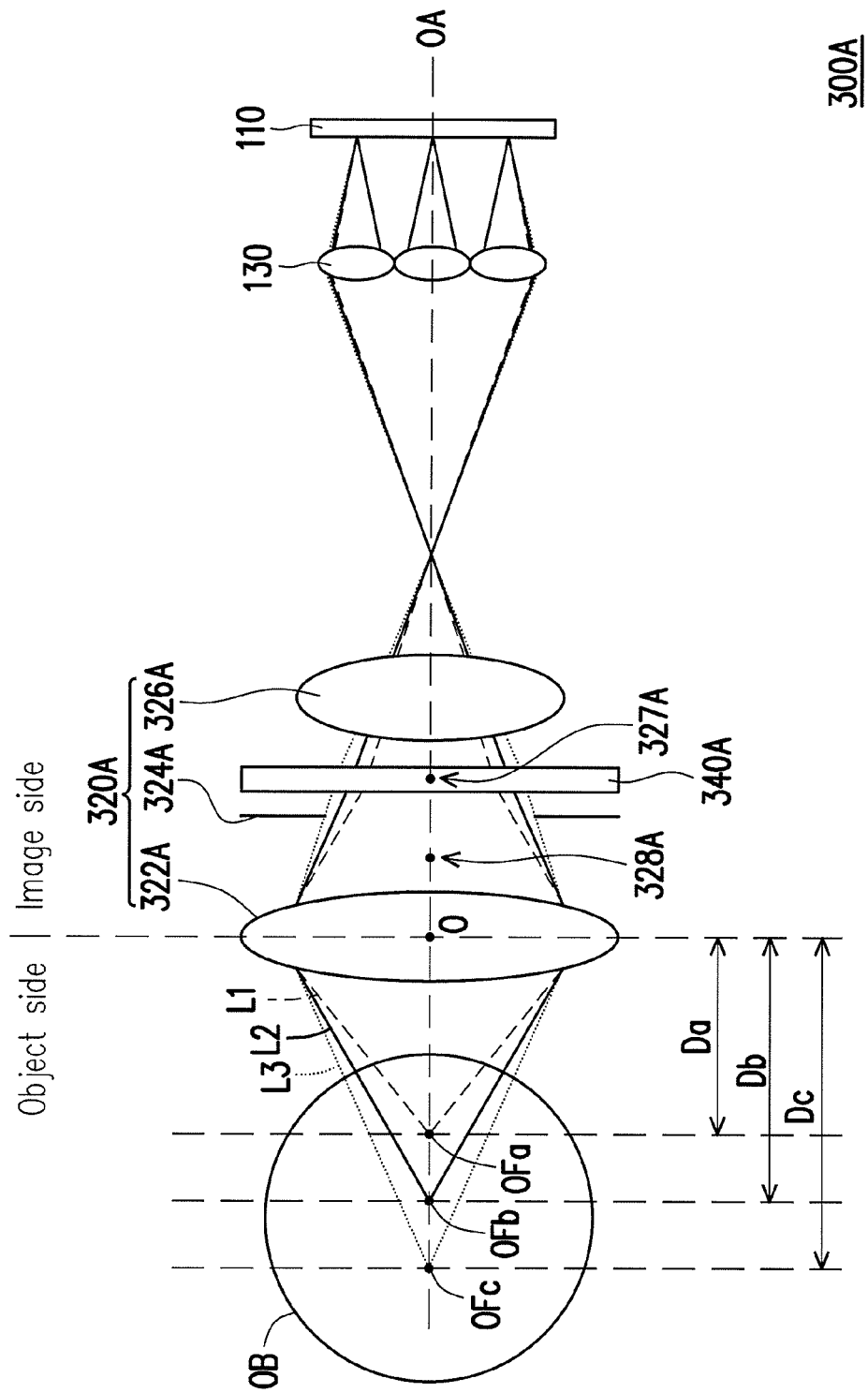
FIG. 3A is a cross-sectional view of an image capturing device according to still another embodiment of the invention.

FIG. 3A is a cross-sectional view of an image capturing device according to still another embodiment of the invention. Referring to FIG. 3A, the image capturing device 300A of the embodiment is similar to the image capturing device 200 of the embodiment of FIG. 2. The components of the image capturing device 300A and related descriptions thereof may refer to the related descriptions of the image capturing device 200, and details thereof are not repeated. A main difference between the image capturing device 300A and the image capturing device 200 is that the first lens element 320A of the image capturing device 300A includes a main lens 322A, an aperture 324A and a secondary lens 326A. In the embodiment, the first lens element 320A includes an entrance pupil 327A and an exit pupil 328A. A viewing position of the aperture 324A from an object side of the first lens element 320A along the optical axis OA is the position where the entrance pupil 327A is located, and a viewing position of the aperture 324A from an image side of the first lens element 320A along the optical axis OA is the position where the exit pupil 328A is located. To be specific, the viewing position of the aperture 324A through the main lens 322A from the object side of the first lens element 320A along the optical axis OA is the position where the aperture 324A the entrance pupil 327A is located, and the viewing the aperture 324A through the second lens 326A from the image side of the first lens element 320A along the optical axis OA is the position where the exit pupil 328A is located. In the embodiment, the variable focal length lens element 340A is disposed at the entrance pupil 327A.

Figure 3B:
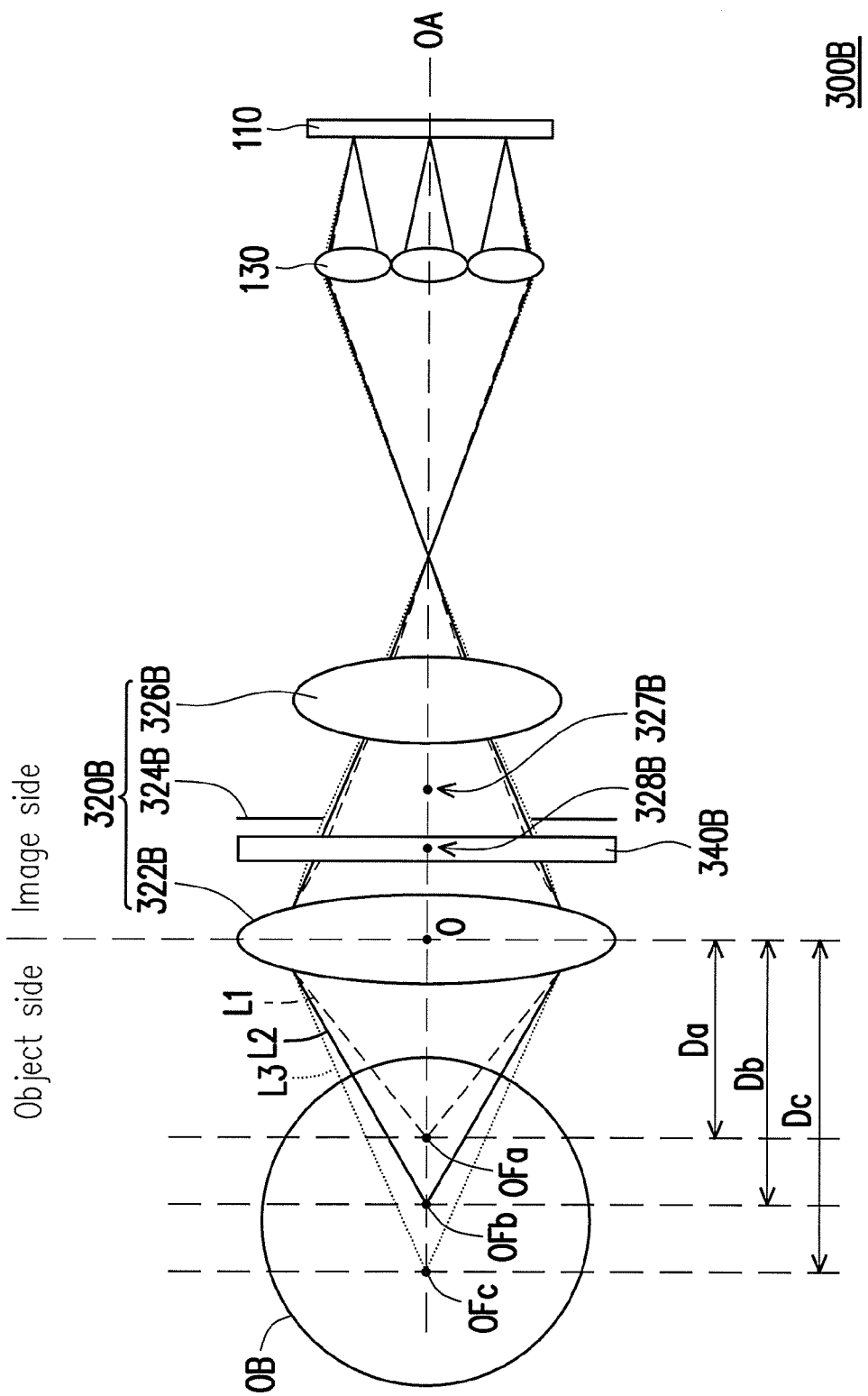
FIG. 3B is a cross-sectional view of an image capturing device according to still another embodiment of the invention.

FIG. 3B is a cross-sectional view of an image capturing device according to still another embodiment of the invention. Referring to FIG. 3B, the image capturing device 300B of the embodiment is similar to the image capturing device 300A of the embodiment of FIG. 3A. The components of the image capturing device 300B and related descriptions thereof may refer to the related descriptions of the image capturing device 300A, and details thereof are not repeated. A main difference between the image capturing device 300B and the image capturing device 300A is that the first lens element 320B of the image capturing device 300B includes a main lens 322B, an aperture 324B and a secondary lens 326B. The first lens element 320B includes an entrance pupil 327B and an exit pupil 328B, and the variable focal length lens element 340B is disposed at the exit pupil 328B.

Figure 4:
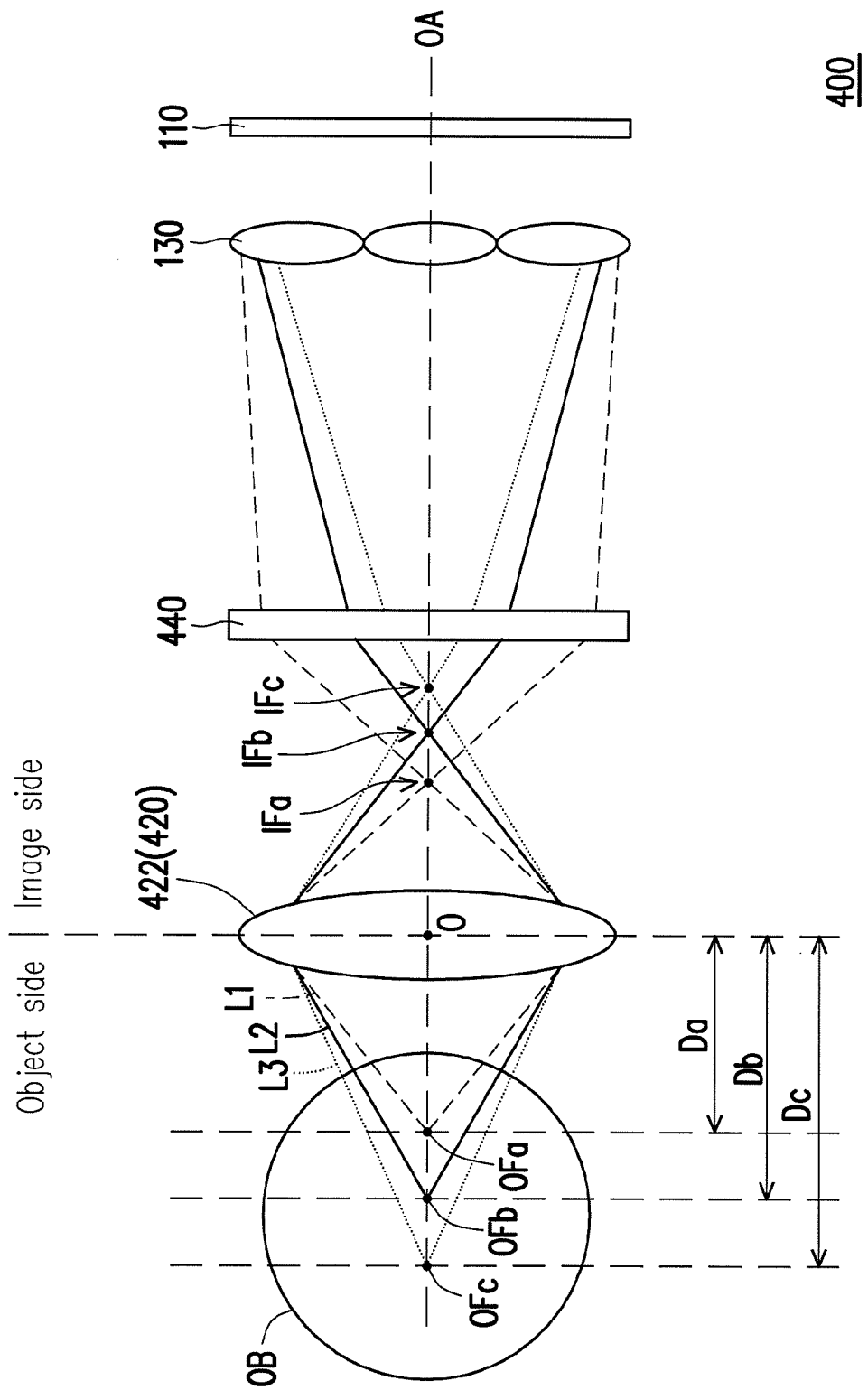
FIG. 4 is a cross-sectional view of an image capturing device according to still another embodiment of the invention.

FIG. 4 is a cross-sectional view of an image capturing device according to still another embodiment of the invention. Referring to FIG. 4, the image capturing device 400 of the embodiment is similar to the image capturing device 100 of the embodiment of FIG. 1A. The components of the image capturing device 400 and related descriptions thereof may refer to the related descriptions of the image capturing device 100, and details thereof are not repeated. A main difference between the image capturing device 400 and the image capturing device 100 is that the variable focal length lens element 440 of the image capturing device 400 is disposed between the first lens element 420 and the second lens element 130. In the embodiment, the main lens 422 of the first lens element 420 focuses the beam L1 coming from the object point OFa of the object OB to a focus position IFa on the optical axis OA. The main lens 422 of the first lens element 420 focuses the beam L2 coming from the object point OFb of the object OB to a focus position IFb on the optical axis OA. Moreover, the main lens 422 of the first lens element 420 focuses the beam L3 coming from the object point OFc of the object OB to a focus position IFc on the optical axis OA. To be specific, the variable focal length lens element 440 is disposed between the focus positions IFa, IFb, IFc and the second lens element 130, and the variable focal length lens element 440 is further disposed between the image plane IP of the range of depth of focus (not shown) of the first lens element 420 and the second lens element 130. The variable focal length lens element 440 is, for example, disposed between the second lens element 130 and the focus position IFc located the nearest to the second lens element 130. The beams L1, L2, L3 coming from the object OB may respectively pass through the focus positions IFa, IFb, IFc to enter the variable focal length lens element 440. A voltage can be exerted to the variable focal length lens element 440 to change the focal power thereof, such that the beams L1, L2, L3 coming from the object OB can be properly deflected to enter the second lens element 130. Then, the image sensing element 110 receives the beams L1, L2, L3 passing through the second lens element 130. In the embodiment, the variable focal length lens element 440 may adjust the focal power thereof to change the focus object points of the image capturing device 400, such that the beams L1, L2, L3 coming from the object points OFa, OFb, OFc with different object distances Da, Db, Dc are selectively received by the image sensing element 110.

Figure 5A:
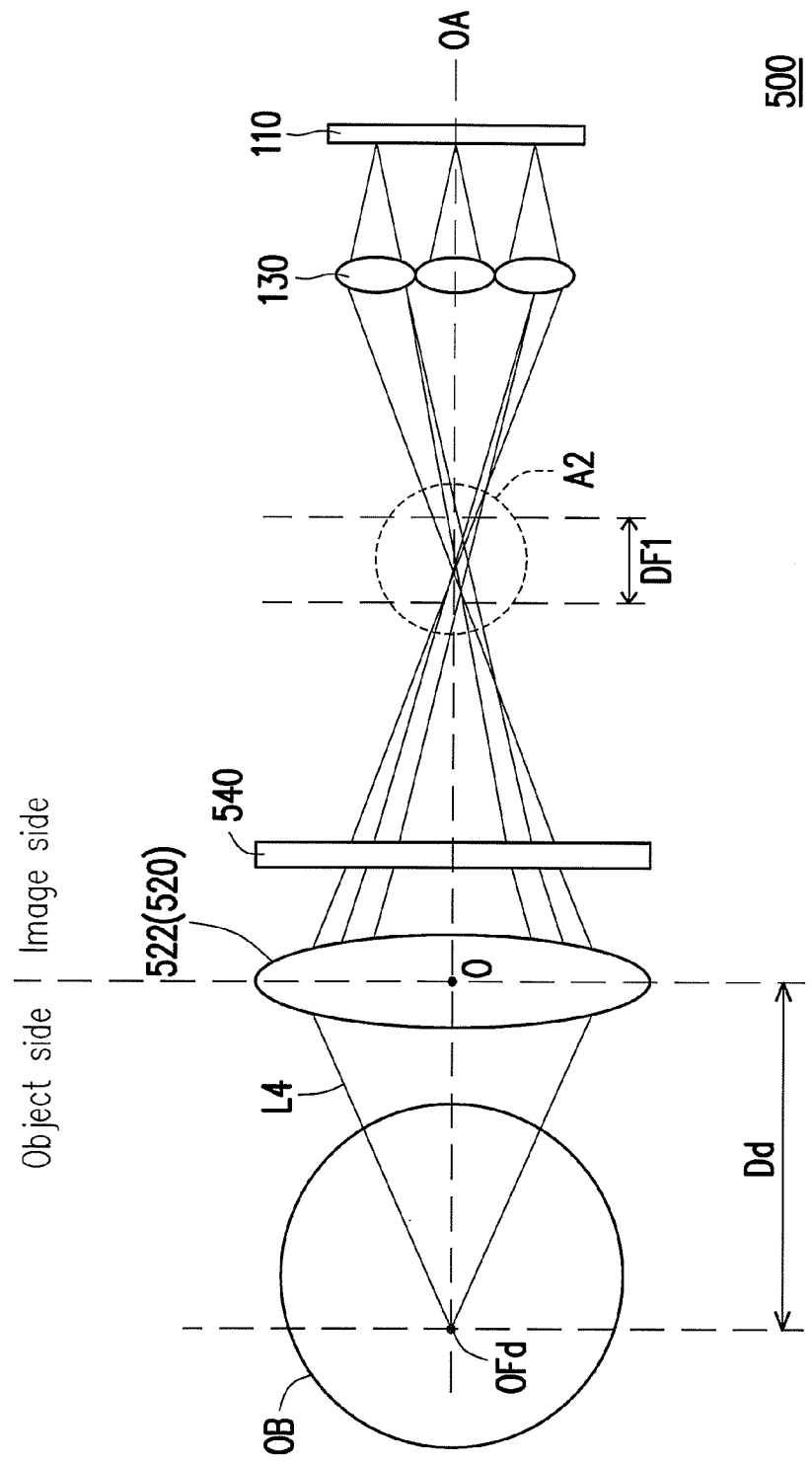
FIG. 5A is a cross-sectional view of an image capturing device according to still another embodiment of the invention.
Figure 5B:
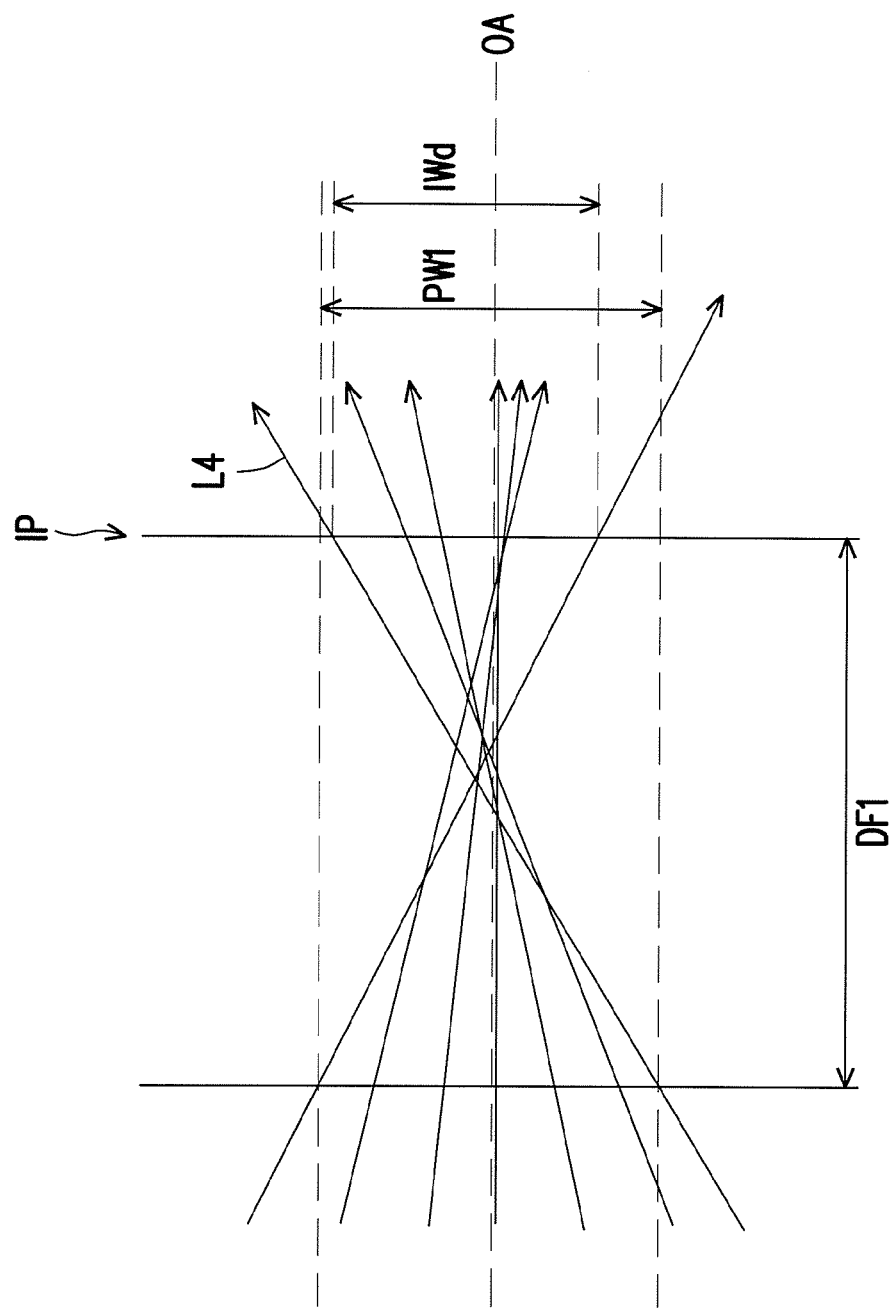
FIG. 5B is an enlarged view of a region A2 in FIG. 5A.

FIG. 5A is a cross-sectional view of an image capturing device according to still another embodiment of the invention, and FIG. 5B is an enlarged view of a region A2 in FIG. 5A. Referring to FIG. 5A and FIG. 5B, the image capturing device 500 of the embodiment is similar to the image capturing device 100 of the embodiment of FIG. 1A. The components of the image capturing device 500 and related descriptions thereof may refer to the related descriptions of the image capturing device 100, and details thereof are not repeated. A main difference between the image capturing device 500 and the image capturing device 100 is that the variable focal length lens element 540 of the image capturing device 500 may adjust the beam L4 coming from the object point OFd of the object OB into a beam with non-circular symmetric wavefront, so as to increase a range of depth of focus of an object side and an image side of the first lens element 520. To be specific, the variable focal length lens element 540 may selectively configure the beams coming from different positions to focus within the range of depth of focus DF1 after these beams pass through the first lens element 520 and the variable focal length lens element 540. For example, the variable focal length lens element 540 may configure the beam L4 coming from the object point OFd to focus within the range of depth of focus DF1 after the beam L4 passes through the first lens element 520 and the variable focal length lens element 540. Moreover, the variable focal length lens element 540 may configure the beams coming from object points other than the object point OFd of the object OB to focus within the range of depth of focus DF1 by adjusting the focal power of the variable focal length lens element 540. In the embodiment, the beam L4 has an image width IWd on the image plane IP of the range of depth of focus DF1. The image width IWd is smaller than a first pixel width PW1, and the first pixel width PW1 is, for example, a total width of 50 image sensing pixels (not shown) in the image sensing element 110, though such total width is not used for limiting the invention. It should be noted that the first pixel width PW1 is greater than the second pixel width PW2 of the embodiment of FIG. 1A and FIG. 1B since the variable focal length lens element 540 of the embodiment adjusts the beam L4 coming from the object point OFd of the object OB into the beam with the non-circular symmetric wavefront. In other embodiments, a magnitude of the first pixel width PW1 and a relationship of the first pixel width PW1 and the second pixel width PW2 can be adjusted according to different designs of the image capturing device, the invention is not limited thereto.

Figure 6:
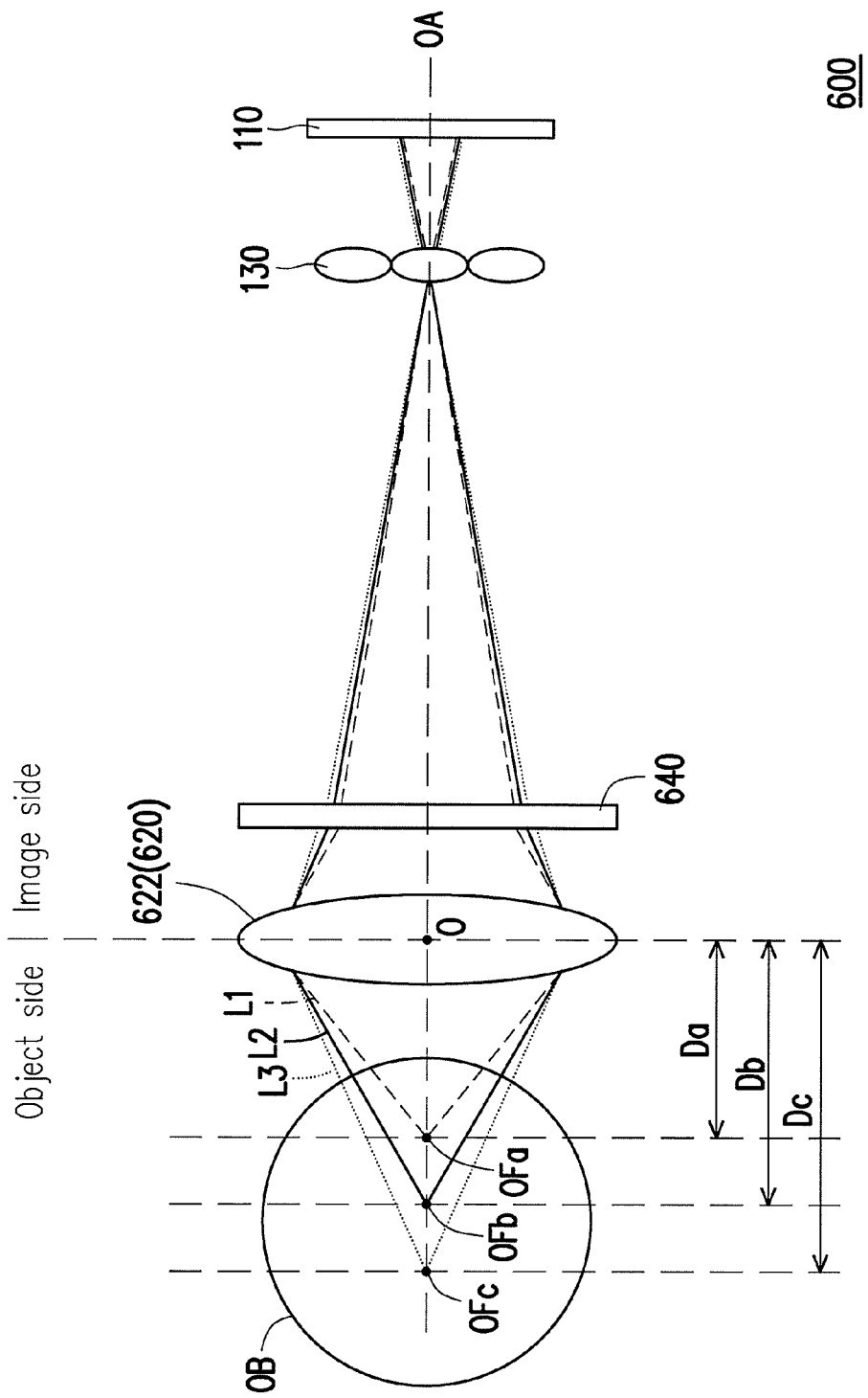
FIG. 6 is a cross-sectional view of an image capturing device according to still another embodiment of the invention.

FIG. 6 is a cross-sectional view of an image capturing device according to still another embodiment of the invention. Referring to FIG. 6, the image capturing device 600 of the embodiment is similar to the image capturing device 100 of the embodiment of FIG. 1A. The components of the image capturing device 600 and related descriptions thereof may refer to the related descriptions of the image capturing device 100, and details thereof are not repeated. A main difference between the image capturing device 600 and the image capturing device 100 is that the variable focal length lens element 640 of the image capturing device 600 may selectively focus the beams coming from different positions and passing through the first lens element 620 and the variable focal length lens element 640, and the second lens element 130 is located in the range of depth of focus at the focus position on the optical axis OA. For example, the variable focal length lens element 640 may selectively make the beam L1 coming from the object point OFa, the beam L2 coming from the object point OFb or the beam L3 coming from the object point OFc to focus within the range of depth of focus where the second lens element 130 is located after the beam passes through the main lens 622 of the first lens element 620 and the variable focal length lens element 640. In the embodiment, the image capturing device 600 is, for example, a non-focus type light field camera, However, in other embodiments, the image capturing device 600 may also be other types of light field camera or an optical image capturing device, the invention is not limited thereto.

Figure 7:
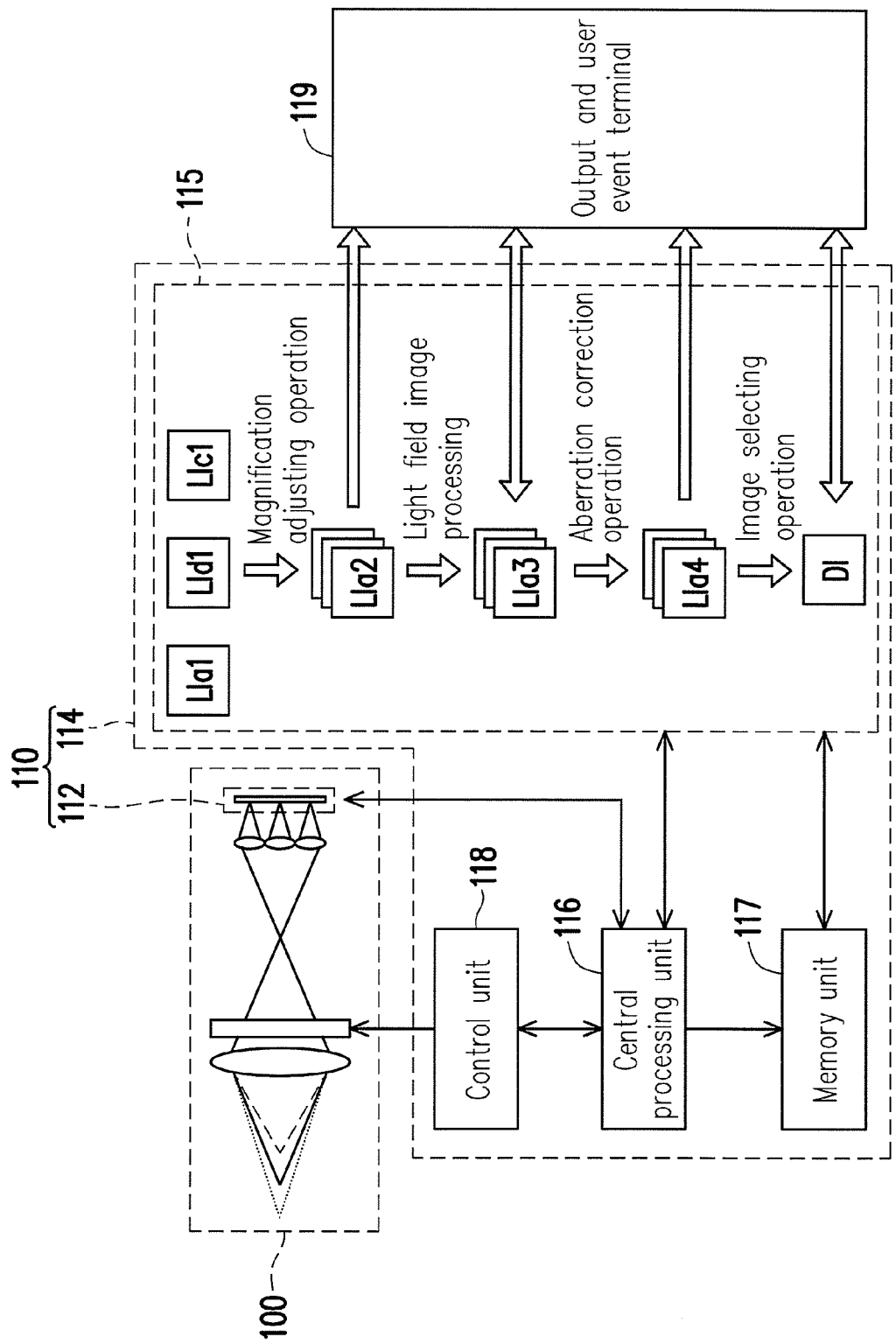
FIG. 7 is a block schematic diagram of an image sensing element according to an embodiment of the invention.

FIG. 7 is a block schematic diagram of an image sensing element according to an embodiment of the invention. Referring to FIG. 7, the image sensing device therein is, for example, any one of the image sensing devices 100, 200, 300A, 300B, 400, 500, 600 of the embodiments of FIG. 1A to FIG. 6. In the embodiment, the image sensing device 100 is taken as example for description, though the invention is not limited thereto. The image sensing element 110 is, for example, applied to the image capturing device 100 of the embodiment of FIG. 1A. The image sensing element 110 includes an image sensor 112 and an image processor 114. The image sensor 112 includes a plurality of image sensing pixels (not shown) configured to sense a plurality of images. To be specific, the images sensed by the image sensor 112 are, for example, light field images. For example, the second lens element 130 of the image capturing device 100, for example, includes a micro lens array (shown in FIG. 1A), and each micro lens on the micro lens array corresponds to a part of the image sensing pixels. The image sensing pixels corresponding to each micro lens are configured to form an image. The image sensor 112 forms a plurality of images through the second lens element 130.

In the embodiment, the image processor 114 is coupled to the image sensor 112 and the image capturing device 100. The image processor 114 receives the images sensed by the image sensor 112. To be specific, the image processor 114 includes a signal processing unit 115, a central processing unit 116, a memory unit 117 and a control unit 118. The image processor 114 is, for example, a central processing unit (CPU), a programmable general purpose or special purpose microprocessor, a digital signal processor (DSP), a programmable controller, application specific integrated circuits (ASIC), a programmable logic device (PLD), other similar device or a combination of these devices described above. Besides, the aforementioned signal processing unit 115, the central processing unit 116, the memory unit 117 and the control unit 118 can be different components respectively. For example, the signal processing unit 115 may be a graphic processing unit (GPU), the central processing unit 116 may be an independent processing chip, and the memory unit 117 may be a movable random access memory (RAM), a read-only memory (ROM), a flash memory or a similar device or a combination of the aforementioned devices. The control unit 118 may be the aforementioned general purpose or special purpose microprocessor or a digital signal processor (DSP), etc., and the central processing unit 116 and the control unit 118 can be integrated in a same chip, the invention is not limited thereto.

Referring to FIG. 1A, FIG. 1B and FIG. 7, in the embodiment, the central processing unit 116 of the image processor 114 controls the variable focal length lens element 140 through the control unit 118 to adjust a focus position of the image capturing device 100. To be specific, the central processing unit 116, for example, transmits a control signal to the control unit 118, and the control unit 118 exerts a proper voltage to the variable focal length lens element 140 according to the control signal. For example, the image capturing device 100 adjusts a focus object distance of the first lens element 120 to the object distance Da through a change of the variable focal length lens element 140, such that the beam L1 emitted from the object point OFa of the object OB is focused at the focus position IFa within the range of depth of focus DF2. Then, the beam L1 focused at the focus position IFa passes through the second lens element 130 and is received by the image sensor 112 of the image sensing element 110. In the embodiment, information of the images is transmitted to the signal processing unit 115 from the image sensor 112, and the signal processing unit 115 operates the information of the images to form the images. To be specific, the images are, for example, a light field image set LIa1. Moreover, the images coming from different micro lenses have different angle information. In some embodiments, the images may also have different light field information according to different micro lenses. The central processing unit 116, the memory unit 117 and the signal processing unit 115 are coupled with each other, and the memory unit 117 is configured to store signal instructions of the central processing unit 116 and the signal processing unit 115 or image content. The central processing unit 116 is configured to control the signal processing unit 115 to perform image processing, and the central processing unit 116 is also configured to control the control unit 118, so as to control the variable focal length lens element 140.

In the embodiment, the image capturing device 100 adjusts the focus object distance of the first lens element 120 to the object distance Db through a change of the variable focal length lens element 140, such that the beam L2 emitted from the object point OFb of the object OB is focused at the focus position IFb within the range of depth of focus DF2. Then, the beam L2 focused at the focus position IFb passed through the second lens element 130 is received by the image sensor 112 of the image sensing element 110, and the signal processing unit 115 processes the image information to form a light field image set LIb1. Similarly, the image capturing device 100 adjusts the focus object distance of the first lens element 120 to the object distance Dc through a change of the variable focal length lens element 140, such that the signal processing unit 115 may process the image information to form a light field image set LIc1. In the embodiment, the time when the image sensor 112 senses the light field images respectively corresponding to the light field image set LIa1, LIb1 and LIc1 are different. Moreover, the images respectively corresponding to the light field image set LIa1, LIb1 and LIc1 have different magnifications since the object distance Da, Db and Dc respectively corresponding to the light field image set LIa1, LIb1 and LIc1 are different. To be specific, the signal processing unit 115 of the image processor 114 is configured to perform a magnification adjustment operation to the images with different magnifications, so as to conform the magnifications of the images corresponding to the light field image set LIa1, LIb1 and LIc1. In the embodiment, the signal processing unit 115 performs the magnification adjustment operation at least according to the controlling parameters of the first lens element 120, the second lens element 130 and the variable focal length lens element 140, so as to correct the magnifications of the images. In some embodiments, the magnification adjustment operation may adjust the magnifications of the images to be consistent, or may adjust the magnifications of the images to be inconsistent. Moreover, in some embodiments, the signal processing unit may correct the amplifications of the images according to other conditions or controlling parameters according to different designs of the image capturing device 100, the invention is not limited thereto.

In the embodiment, the images corresponding to the light field image set LIa1 form a light field image set LIa2 after the magnification adjustment operation, the images corresponding to the light field image set LIb1 form a light field image set LIb2 after the magnification adjustment operation, and the images corresponding to the light field image set LIc1 form a light field image set LIc2 after the magnification adjustment operation (in FIG. 7, the light field image sets LIa2, LIb2, LIc2 are shown as stacked layers, and only the light field image set LIa2 is indicated). The magnifications of the images corresponding to the light field image sets LIa2, LIb2, LIc2 are consistent. The light field image sets LIa2, LIb2, LIc2 can be selectively export to an output and user event terminal 119 for providing to the user.

In the embodiment, the signal processing unit 115 of the image processor 114 may perform a light filed image processing on the images corresponding to the light field image sets LIa2, LIb2, LIc2 to transform the light field images into non-light field images. To be specific, the images corresponding to the light field image sets LIa2, LIb2, LIc2 at least have a plurality of angle information corresponding to different micro lenses. In the embodiment, the signal processing unit 115 performs the image processing on the images corresponding to the light field image set LIa2 according to the angle information corresponding to different micro lenses. The images are combined to form a non-light field image LIa3 after the image processing. Similarly, the signal processing unit 115 performs the image processing on the images respectively corresponding to the light field image set LIb2 and LIc2 according to the angle information corresponding to different micro lenses. The images corresponding to the light field image set LIb2 and LIc2 are respectively combined to form a non-light field image LIb3 and a non-light field image LIc3 after the image processing (in FIG. 7, the non-light field images LIa3, LIb3, LIc3 are shown as stacked layers, and only the light field image LIa3 is indicated). The non-light field image LIa3, the non-light field image LIb3 and the non-light field image LIc3 can be selectively output to the output and user event terminal 119 for providing to the user. Moreover, the user may also provide instructions through the output and user event terminal 119 to control the light field image processing. For example, in some embodiments, the signal processing unit 115 may perform the image processing on the images corresponding to the light field image sets according to the light field information corresponding to different micro lenses, so as to form one or a plurality of non-light field images. Moreover, in some embodiments, the signal processing unit 115 may also transform the images corresponding to the light field image sets into one or a plurality of non-light field images according to a specific image processing method, the invention is not limited thereto.

In the embodiment, the signal processing unit 115 of the image processor 114 may further perform an aberration correction operation to the images processed with the light field image processing to improve resolution of the images. To be specific, the image processing unit 115 may perform the aberration correction operation to the non-light field images LIa3, LIb3 and LIc3 processed with the light field image processing to improve the resolution of the non-light field images LIa3, LIb3 and LIc3. The aberration correction operation, for example, includes a spherical aberration correction, a comma aberration correction, a chromatic aberration correction, a distortion aberration correction, a pincushion aberration correction, a barrel aberration correction or other types of aberration correction. The non-light field images LIa3, LIb3, LIc3 are respectively transformed into non-light field images LIa4, LIb4, LIc4 with higher resolution (in FIG. 7, the non-light field image LIa4, LIb4, LIc4 are shown as stacked layers, and only the non-light field image set LIa4 is indicated) through the aberration correction operation. Moreover, the non-light field image LIa4, LIb4 and LIc4 can be selectively output to the output and user event terminal 119 for providing to the user. Besides, in some embodiments, the signal processing unit 115 may improve the image resolution of the non-light field images LIa3, LIb3 and LIc3 according to wavefront information of the variable focal length lens element 140, or the signal processing unit 115 may also adjust the image resolution of the non-light field images LIa3, LIb3 and LIc3 according to other settings, the invention is not limited thereto.

In the embodiment, the signal processing unit 115 of the image processor 114 may perform an image selecting operation on the images processed with the light field image processing to select at least a part of regions from the images, and combine the selected part of regions to form a depth-of-field (DOF) image. To be specific, the signal processing unit 115 performs the image selecting operation on the non-light field images LIa4, LIb4 and LIc4 processed with the light field image processing and the aberration correction operation. In the embodiment, the non-light field image LIa4, for example, corresponds to the object distance Da of the first lens element 120, and a part of region of the non-light field image LIa4 corresponding to the object point OFa is clear. The non-light field image LIb4 corresponds to the object distance Db of the first lens element 120, and a part of region of the non-light field image LIb4 corresponding to the object point OFb is clear. Moreover, the non-light field image LIc4 corresponds to the object distance Dc of the first lens element 120, and a part of region of the non-light field image LIc4 corresponding to the object point OFc is clear. The image processing unit 115 selects a part of region of the non-light field image LIa4 corresponding to the object point OFa, selects a part of region of the non-light field image LIb4 corresponding to the object point OFb, and selects a part of region of the non-light field image LIc4 corresponding to the object point OFc. To be specific, the signal processing unit 115 at least combines the selected part of region corresponding to the object point OFa, the part of region corresponding to the object point OFb and the part of region corresponding to the object point OFc to form a DOF image DI. In the embodiment, the DOF image DI can be selectively output to the output and user event terminal 119 for providing to the user. Moreover, the user may also provide instructions through the output and user event terminal 119 to control the image selecting operation.

In the embodiment, the DOF image DI has a larger DOF compared to that of the non-light field images LIa4, LIb4 and LIc4 since the DOF image DI includes the clearer region of the non-light field image LIa4 corresponding to the object distance Da, the clearer region of the non-light field image LIb4 corresponding to the object distance Db and the clearer region of the non-light field image LIc4 corresponding to the object distance Dc. However, in some embodiments, the signal processing unit 115 may also combine the part of regions of the non-light field images LIa4, LIb4 and LIc4 in other forms according to a different requirement from the user, so as to form the DOF image DI with the DOF the same with that of the non-light field image LIa4, LIb4 or LIc4. Alternatively, the signal processing unit 115 may also form the DOF image DI with the DOF smaller than that of the non-light field images LIa4, LIb4 and LIc4, the invention is not limited thereto. Besides, the signal processing unit 115 may also select a part of regions of the non-light field images LIa4, LIb4 and LIc4 to implement other image processing or application according to a different requirement from the user, the invention is also not limited thereto.

Referring to FIG. 1A, FIG. 1B and FIG. 7, in the embodiment, the variable focal length lens element 140 may selectively make the beams L1, L2 and L3 of the object points OFa, OFb and OFc with different object distances Da, Db and Dc to focus at focus positions IFa, IFb and IFc within the range of depth of focus DF2 after the beams L1, L2 and L3 pass through the main lens 122 of the first lens element 120 and the variable focal length lens element 140. Moreover, the image widths IWa, IWb and IWc of the beams L1, L2 and L3 on the image plane IP of the range of depth of focus DF2 are smaller than the second pixel width PW2. Therefore, the image capturing device 100 may selectively configure the beams coming from different positions of the object OB to focus within the range of depth of focus DF2 after the beams pass through the first lens element 120 and the variable focal length lens element 140 through the focal power change of the variable focal length lens element 140. Then, the beams coming from the object OB enter the second lens element 130 and are received by the image sensing element 110. The image sensing element 110 may generate the light field images corresponding to the light field image set LIa1, LIb1 and LIc1 through the change of the focal power of the variable focal length lens element 140. Meanwhile, the light field image set LIa1, LIb1 and LIc1 are respectively correspond to the object distance Da, Db and Dc, and the image processing of the embodiment of FIG. 7 can be performed to the images corresponding to the light field image set LIa1, LIb1 and LIc1 to obtain the DOF image DI. Moreover, the DOF image DI may achieve different DOFs through image combinations through the image selecting operation of the image processor 114. Therefore, the light field images corresponding to light field image sets LIa1, LIb1 and LIc1 generated by the image capturing device 100 may form the DOF image DI through image combination, and the DOF image DI may have different DOFs. Besides, the image processing of the embodiment of FIG. 7 may further include performing the aberration correction operation on the non-light field images LIa3, LIb3 and LIc3 to form the non-light field images LIa4, LIb4 and LIc4 with a higher resolution. Therefore, the DOF image DI formed by the non-light field images LIa4, LIb4 and LIc4 may also have a higher image resolution.

In the aforementioned embodiments, a plurality of light field images generated by the image capturing device 100 of the embodiment of FIG. 1A and FIG. 1B, the image capturing device 200 of the embodiment of FIG. 2, the image capturing device 300A of the embodiment of FIG. 3A, the image capturing device 300B of the embodiment of FIG. 3B, the image capturing device 400 of the embodiment of FIG. 4, the image capturing device 500 of the embodiment of FIG. 5A and FIG. 5B, and the image capturing device 600 of the embodiment of FIG. 6 can also be combined through the image combination of the embodiment of FIG. 7 to obtain different DOFs.

Figure 8:
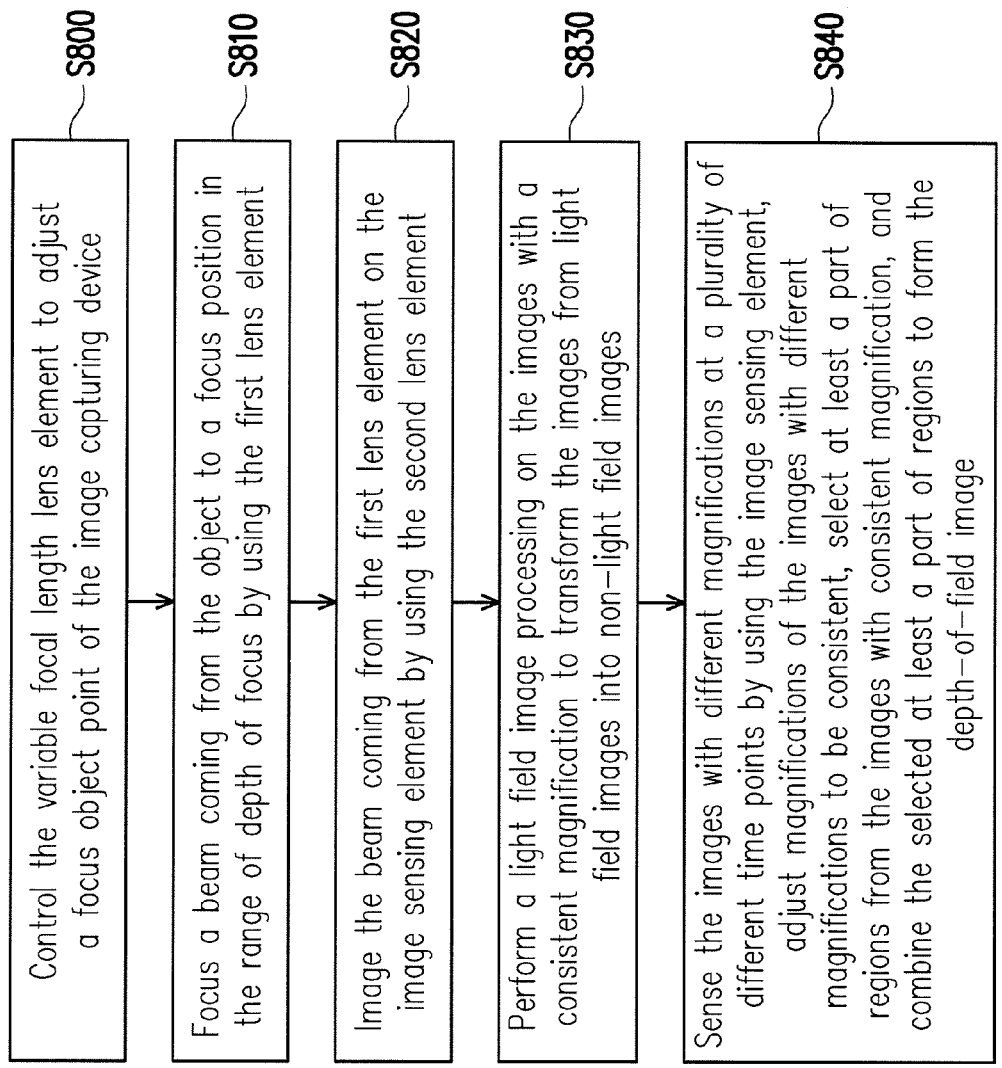
FIG. 8 is a flowchart illustrating an image capturing method according to an embodiment of the invention.

FIG. 8 is a flowchart illustrating an image capturing method according to an embodiment of the invention. Referring to FIG. 8, the image capturing method can be applied to the image capturing device 100 of FIG. 1A and FIG. 1B, the image capturing device 200 of FIG. 2, the image capturing device 300A of FIG. 3A, the image capturing device 300B of FIG. 3B, the image capturing device 400 of FIG. 4, the image capturing device 500 of FIG. 5A and FIG. 5B, and the image capturing device 600 of FIG. 6. The image capturing method includes following steps. In step S800, a variable focal length lens element is controlled to adjust a focus object point of the image capturing device. Then, in step S810, a beam coming from the object is focused to a focus position in the range of depth of focus by using a first lens element. In the embodiment, according to the structure of the variable focal length lens element, the beam is, for example, adjusted into a beam with a non-circular symmetric wavefront or a beam with a circular symmetric wavefront.

In step S820, the beam coming from the first lens element is imaged on an image sensing element by using a second lens element. In step S830, the image sensing element is adopted to perform a light field image processing on the images with a consistent magnification to transform the images from light field images into non-light field images. Then, in step S840, the images with different magnifications are sensed at a plurality of different time by using the image sensing element, and magnifications of the images with different magnifications are adjusted to be consistent. At least a part of regions is selected from the images with consistent magnification, and the selected at least a part of regions are combined to form a DOF image.

Moreover, since enough instructions and recommendations of the image capturing method of the invention can be learned from the descriptions of the embodiments of FIG. 1 to FIG. 7, thus, detailed description thereof is not repeated In summary, the embodiments of the invention have at least one of the following advantages or effects. In the embodiments of the invention, the first lens element of the image capturing device has a range of depth of focus, and is configured to focus at least one beam coming from the object to the focus position within the range of depth of focus. The variable focal length lens element is disposed between the first lens element and the second lens element or inside the first lens element, and is configured to adjust a focus object distance of the image capturing device. The beam has an image width on an image plane of the range of depth of focus, where the image width is smaller than a first pixel width. Therefore, the image capturing device may obtain images with different DOFs through the variable focal length lens element. Moreover, the image capturing method of the invention may adopt the variable focal length lens element to adjust the focus object point of the image capturing device. The images with different magnifications are sensed at a plurality of different time by using the image sensing element. Magnifications of the images with different magnifications are adjusted to be consistent. At least a part of regions is selected from the images with consistent magnification, and the selected at least a part of regions are combined to form the DOF image. Therefore, according to the image capturing method, the images with different DOFs can be obtained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image capturing device, adapted to capture a plurality of images of an object, comprising:
    an image sensing element, comprising a plurality of image sensing pixels configured to sense the images;
    a first lens element, having a range of depth of focus, and configured to focus at least one beam coming from the object to a focus position in the range of depth of focus;
    a second lens element, disposed between the first lens element and the image sensing element; and
    a variable focal length lens element, disposed between the first lens element and the second lens element or inside the first lens element, and configured to change a focal power for adjusting a focus object distance of the image capturing device,
    wherein the beam has an image width on an image plane of the range of depth of focus, and the image width is smaller than a first pixel width, and
    wherein the image sensing element senses the images with different magnifications at a plurality of different time, and in response to the image sensing element having sensed the images with different magnifications at the plurality of different time, the image sensing element performs a magnification adjusting operation on the images with different magnifications to make the magnifications of the images to be consistent.

2. The image capturing device as claimed in claim 1, wherein the variable focal length lens element is disposed inside the first lens element, the first lens element comprises an aperture, and the variable focal length lens element is disposed at the aperture.

3. The image capturing device as claimed in claim 1, wherein the variable focal length lens element is disposed inside the first lens element, the first lens element comprises an entrance pupil and an exit pupil, and the variable focal length lens element is disposed at the entrance pupil or the exit pupil.

4. The image capturing device as claimed in claim 1, wherein the variable focal length lens element is disposed between the first lens element and the second lens element, and the variable focal length lens element is disposed between the image plane and the first lens element.

5. The image capturing device as claimed in claim 1, wherein the variable focal length lens element is disposed between the first lens element and the second lens element, and the variable focal length lens element is disposed between the image plane and the second lens element.

6. The image capturing device as claimed in claim 1, wherein the beam passes through the variable focal length lens element, and the variable focal length lens element adjusts the beam into a beam with a non-circular symmetric wavefront.

7. The image capturing device as claimed in claim 1, wherein the image width is smaller than a second pixel width, and the second pixel width is smaller than the first pixel width.

8. The image capturing device as claimed in claim 7, wherein the beam passes through the variable focal length lens element, and the variable focal length lens element adjusts the beam into a beam with a circular symmetric wavefront.

9. The image capturing device as claimed in claim 1, wherein the image sensing element comprises:
    an image sensor, comprising the image sensing pixels, configured to sense the images; and
    an image processor, electrically connected to the variable focal length lens element, and configured to control the variable focal length lens element to adjust the focus object distance of the image capturing device, such that the image sensor senses the images with different magnifications at the plurality of different time.

10. The image capturing device as claimed in claim 9, wherein the image processor performs the magnification adjusting operation on the images with different magnifications to make the magnifications of the images to be consistent.

11. The image capturing device as claimed in claim 10, wherein the image processor performs a light field image processing on the images with the consistent magnification to transform the images from light field images into non-light field images.

12. The image capturing device as claimed in claim 11, wherein the image processor performs an image selecting operation on the images processed with the light field image processing to select at least a part of regions from the images, and combines the selected at least a part of regions to form a depth-of-field image.

13. The image capturing device as claimed in claim 11, wherein the image processor performs an aberration correction operation on the images processed with the light field image processing to improve the resolution of the images.

14. An image capturing method, adapted to capture a depth-of-field image of an object by using an image capturing device, wherein the image capturing device comprises a first lens element, a second lens element and an image sensing element arranged in sequence from the object, the image capturing device further comprises a variable focal length lens element, and the variable focal length lens element is disposed between the first lens element and the second lens element or inside the first lens element, the image capturing method comprising:

controlling the variable focal length lens element to change a focal power for adjusting a focus object point of the image capturing device, wherein the first lens element has a range of depth of focus;

focusing a beam coming from the object to a focus position in the range of depth of focus by using the first lens element, wherein the beam has an image width on an image plane of the range of depth of focus, and the image width is smaller than a first pixel width;

imaging the beam coming from the first lens element on the image sensing element by using the second lens element; and sensing the images with different magnifications at a plurality of different time by using the image sensing element, adjusting magnifications of the images with different magnifications to be consistent, selecting at least a part of regions from the images with consistent magnification, and combining the selected at least a part of regions to form the depth of field image in sequence.

15. The image capturing method as claimed in claim 14, further comprising:

adjusting the beam into a beam with a non-circular symmetric wavefront by using the variable focal length lens element.

16. The image capturing method as claimed in claim 14, wherein the image width is smaller than a second pixel width, and the second pixel width is smaller than the first pixel width.

17. The image capturing method as claimed in claim 16, further comprising:

adjusting the beam into a beam with a circular symmetric wavefront by using the variable focal length lens element.

18. The image capturing method as claimed in claim 14, further comprising:

performing a light field image processing on the images with the consistent magnification to transform the images from light field images into non-light field images by using the image sensing element.

19. The image capturing method as claimed in claim 18, wherein the image processor performs an aberration correction operation on the images processed with the light field image processing to improve a resolution of the images.

\* \* \* \* \*